Patented July 4, 1933

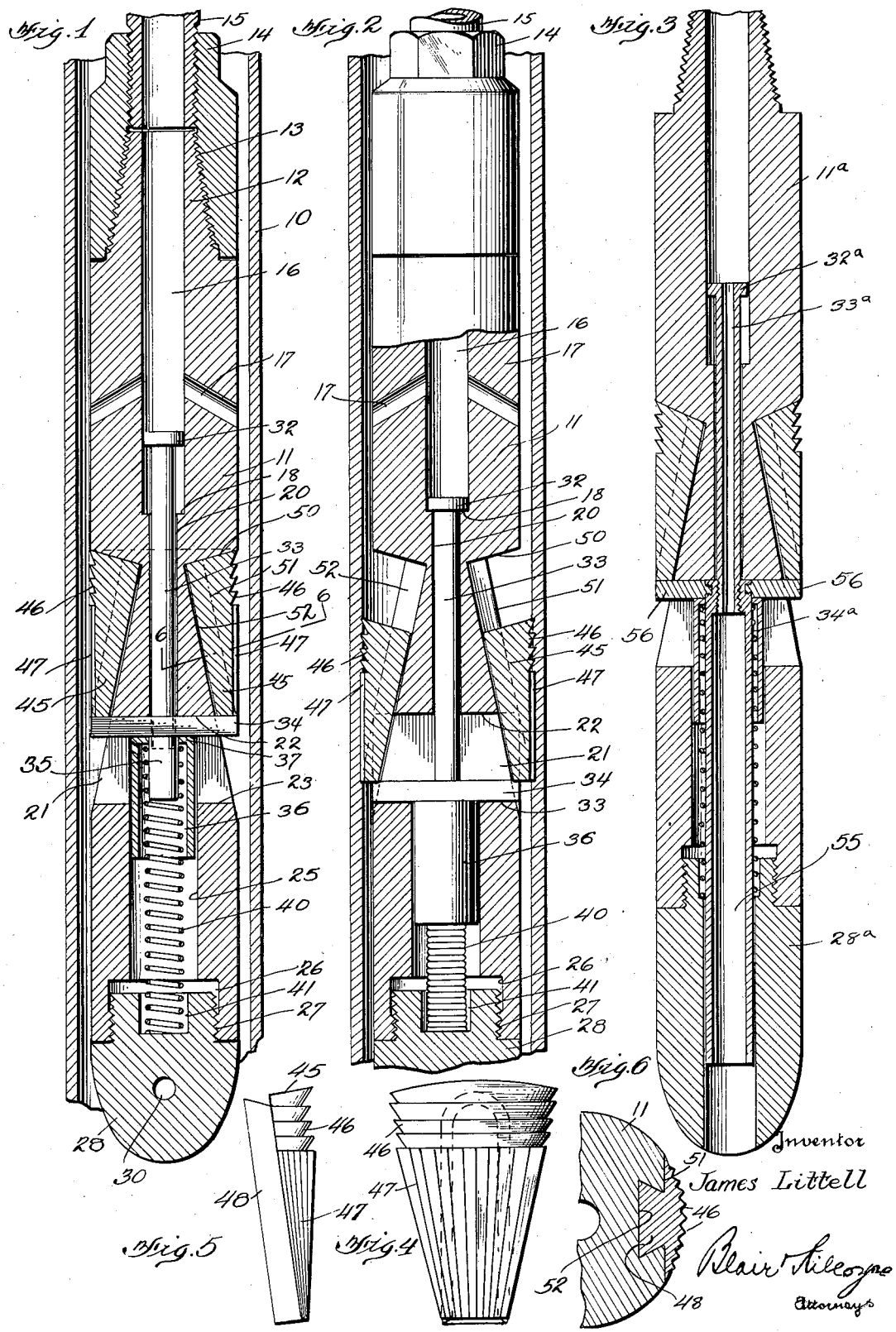

1,917,135

UNITED STATES PATENT OFFICE

JAMES LITTELL, OF MARACAIBO, VENEZUELA

WELL APPARATUS

Application filed February 17, 1932. Serial No. 593,612.

This invention relates to well apparatus and more particularly to improvements in apparatus for backing off and/or raising sections of a well casing or tubing.

An object of my invention is to provide a practical and rugged device or tool for "backing off" or unscrewing sections of a well casing or tubing and for raising the same. A further object is to provide apparatus of the above character which is composed of relatively few parts so constituted and arranged in relation to each other as to efficiently and effectively perform the purposes for which the invention is intended. A further object is to provide apparatus which may be readily inserted in a well casing or tubing and, when so arranged, may be coupled therewith whereby to unscrew a casing section or sections and raise the same, and which may be readily released from such coupling relation and withdrawn from the casing when necessary.

Other objects will be in part obvious and in part hereinafter pointed out in connection with the accompanying sheet of drawing illustrating an embodiment of my invention.

In the drawing—

Fig. 1 is a longitudinal vertical section of my improved device, shown for clarity of illustration within a well casing or tubing which is to be raised and in uncoupled relation therewith;

Fig. 2 is a view similar to that of Fig. 1 showing the tool in coupled relation to a casing or tubing section;

Fig. 3 is a modification of the device illustrated in Figs. 1 and 2;

Fig. 4 is a face view of a slip or wedge in accordance with my invention;

Fig. 5 is a side view thereof; and

Fig. 6 is a section along lines 6—6 of Fig. 1, illustrating the connection between a slip and the body of the device.

Referring now to the drawing, the reference character 10 designates a section of the casing or tubing which is to be withdrawn, with the tool or device in accordance with my invention arranged therein prior to coupling with the casing.

The tool comprises a spear body 11 of generally circular cross section and of diameter permitting sufficient clearance in relation to the internal diameter of the casing. The upper end of the body 11 is reduced in diameter as at 12 and is threaded as at 13 for connection to a nipple 14 which in turn is threaded to a tube 15 extending to a source of hydraulic pressure, such as a pump, at the ground level, and also coupled to power means by which the tube 15 and consequently body 11 may be rotated. The body 11 is centrally bored as at 16 for a portion of its length and is thus in pressure communicating relation with tube 15. Branch bores 17, extending radially from the main bore 16, serve to release excess of fluid pressure therein.

The said bore 16 terminates in a shoulder or seat 18 which opens into a communicating bore 20 of preferably lesser diameter than bore 16 and which similarly extends centrally and longitudinally of the body 11 for a portion of its length. Substantially midway of the body 11 there is provided a preferably rectangular opening or slot 21 which extends transversely through body 11 and into which the bore 20 opens. The relatively upper and lower horizontal walls of the slot 21 will be hereinafter referred to as 22, 23, respectively.

The body 11, at its lowermost end, is provided with a further centrally arranged bore 25 which, at its upper end, extends to the upper horizontal wall 22 of slot 21, the lowermost portion of which is enlarged as at 26 and threaded as at 27 for the reception and connection of a threaded shank of a tip or plug 28, which for convenience in handling is provided with a transverse aperture 30 passing therethrough.

A piston or plunger 32 is arranged for reciprocating movement in bore 16, being subjected to fluid pressure from tubing 15. The said plunger includes a plunger rod 33 which is operable in the bore 20, the rod carrying at its lower end a T piece including a cross head 34 which in turn is operable in the transverse slot 21 and between the walls 22, 23 thereof. Preferably, plunger rod 33 is threaded into the cross head, which has formed thereon a downwardly extending bushing 35 arranged within a bushing 36 movable in bore 25 of the body 11. The bushing 36 is of substantial length and has one end turned over as at 37 to form a seat for a spring 40, one end of the spring being seated in enveloping relation to the cross head bushing 35 and the other end being seated in a recess 41 formed in the plug 28. Spring 40 being under compression functions to raise the cross head against wall 22 of the transverse slot 21.

A set of slips 45, more clearly shown in Figs. 4 and 5, are provided at opposed sides of the body 11, the slips comprising wedge-shaped elements of hardened steel and having both horizontally and vertically arranged biting teeth 46, 47, respectively, on their arcuate faces. On the under face of each slip is provided a dove-tail key 48 which at its relatively upper end terminates in a semi-circular key portion. The slips 45 fit into machined notches cut into the body 11 on each side thereof, the notches converging towards each other in a relatively upward direction and being defined by the right-angle surfaces 50, 51, respectively. Surface 51 is provided with an undercut keyway 52 which terminates in a semi-circular configuration. It will thus be seen that the way 52 may be readily formed by a conventional milling cutter.

The slips are of a length so as to be accommodated snugly between the wall 50 of the body notches and the wall 22 of the transverse slot 21. Against the latter the cross head 34, under urge of spring 40, normally engages and, consequently, cross head 34 with its associated spring serves to hold the slips fast prior to pressure being exerted on piston 32. By such an arrangement the slips are held in retracted position against accidental displacement during insertion into or withdrawal of the tool from the casing.

The operation of the device illustrated in Figs. 1 and 2 is as follows: The device is inserted within the casing section to be unscrewed and pulled from the well, and the tube 15 is connected with a source of fluid pressure and similarly coupled to a power rotating and raising means, it being understood that fluid pressure is not communicated to piston 32 until desired. In the absence of such fluid pressure, the piston 32 and cross head 34 are maintained in raised position by the action of spring 40. Consequently the slips 45 are held snugly in retracted position as illustrated in Fig. 1. When coupling of the slips with the casing is desired, fluid pressure is transmitted through tube 15 into bore 16 and acts against piston 32, forcing the same into seating relation with shoulder 18. This pressure is sufficient to move the cross head downwardly against the urge of spring 40, and slips 45 move downwardly through gravity and are expanded radially relative to the body 11 of the tool into contacting engagement with casing 10, as will be seen with reference to Fig. 2.

If it is desired to unscrew a casing section 11 from a lower section, it will be understood that threads 13 will be cut left-handed as conventional threading between the tube sections consists of right-hand threads. Consequently, rotation of the tool in such manner as to unthread the casing section 11 from a lowermost section does not cause uncoupling of tube 15 from the body 11. Such rotative force, by the longitudinal biting teeth 47 of slips 45, is transmitted to the casing section and acts to unscrew the same. The horizontally arranged biting teeth 46 of the slips bite into the inner wall of the casing section when an upward or pulling force is applied to the tool and function to hold the casing to the tool as the latter is pulled upwardly.

If for some reason the casing section has become lodged to a degree that unscrewing is found impossible or impractical, it will be readily understood that fluid pressure in bore 16 may be discontinued to permit the slips 45 to assume their initial retracted position in relation to the body 11 and the tool may be withdrawn from the casing. Branch bores 17 function to relieve bore 16 of excess pressure during continued operation of the pump over and above that necessary to move the cross head 34 downwardly against the urge of spring 40.

In Fig. 3 I have shown a modified device in which an alternative method of circulating the fluid under pressure is proposed. In such embodiment no relief pressure bores in the spear body, such as the bores 17 of the Figs. 1 and 2 construction, are provided, excess pressure being exhausted through the tool by the longitudinally bored plunger 32a, 33a, and a connected exhaust tube 55 which delivers through a bore in plug or tip 28a. The diameter of the bore for a portion or all of its length is such as to regulate the pressure acting against the plunger head. In this modified form of the invention, the T-piece comprising cross head 34 and its extending bushing 35 may be eliminated, and stop pins 56 which screw into the exhaust tube 55 perform the function of a crosshead. Alternatively, the bored plunger 32a, 33a may be extended longitudinally to extend through the spear body and tip 28a, thus to take the place of exhaust tube 55, in which event, pins 56 are screw-threaded in or otherwise fixed directly to the plunger. While excess pressure is relieved through the device, otherwise the operation of the Fig. 3 construction is substantially that as described in connection with the device as previously explained.

While one set of slips is illustrated, it will be appreciated that a plurality of sets of slips as aforesaid may be arranged along the length of the spear body, each of such sets cooperating with a cross head connected to the common plunger and plunger rod 32, 33 of the Fig. 1 construction, or 32a, 33a of the Fig. 3 construction.

Without further analysis, the foregoing will so fully reveal the gist of this invention that others can by applying current knowledge readily adapt it for various applications without omitting certain features that from the standpoint of the prior art fairly constitute essential characteristics of the generic or specific aspects of this invention, and therefore such adaptations should and are intended to be comprehended within the meaning and range of equivalency of the following claims.

I claim:

1. In a device of the character described, a body portion, slips movably connected with the body portion and movable by gravity from a normally retracted position therein into coupling engagement with a well casing, a cross head disposed below the slips and movable in the body, the slips engaging with and being supported on the cross head, spring means contained within the body and operative through the cross head to maintain the slips in said retracted position, the body having a connection with a source of fluid pressure, a reciprocating plunger within the body responsive to such pressure, and a connection between the plunger and the cross head.

2. In a device of the character described, a body portion having a bore in communication with a source of fluid pressure, the body portion having a transverse slot in which the bore terminates, a plunger movable in the bore and including a plunger rod extending through the bore to the slot, a cross head carried by said rod and movable in the slot, slips mounted in the body and movable by gravity from a retracted position to a coupling relation with a well casing, said slips being supported freely on the cross head, and means engaging the cross head to actuate the slips to a retracted position, the plunger upon the occurrence of pressure in the bore being operative to actuate the cross head against the action of said means.

3. In a device of the character described, a body portion having a bore in communication with a source of fluid pressure, the body portion having a transverse slot in which the bore terminates, a plunger movable in the bore and including a plunger rod extending through the bore to the slot, a cross head carried by said rod and movable in the slot, slips mounted in the body and movable by gravity from a retracted position to a coupling relation with a well casing, said slips being supported freely on the cross head, and the body being further bored for the reception of a spring therein, the spring acting against the cross head to maintain the slips in retracted position, the plunger upon the occurrence of pressure in the bore being operative to actuate the cross head against the urge of said spring.

4. In a device of the character described, a spear body having a bore extending therethrough, the bore communicating at its upper end with a source of fluid under pressure, a longitudinally bored plunger in said bore responsive for its actuation to such pressure, the fluid passing through the plunger for discharge adjacent the tip end of the spear body, a transverse slot in the body into which said plunger extends, slips mounted on said body and movable by gravity from a normal, retracted position, means carried by said plunger on which said slips are supported, and a spring arranged in said bore and reacting against said first means to hold the slips in normal, retracted position.

5. In a device of the character described, a spear body having a bore extending therethrough, the bore communicating at its upper end with a source of fluid under pressure, a longitudinally bored plunger in said bore responsive for its actuation to such pressure, the fluid passing through the plunger for discharge adjacent the tip end of the spear body, a transverse slot in the body into which said plunger extends, slips mounted on said body and movable by gravity from a normal, retracted position, stop pins carried by said plunger on which said slips are freely supported, and a spring arranged in said bore about a portion of said plunger and reacting against said first means to hold the slips in normal, retracted position.

Signed at Maracaibo, Venezuela, South America, this 1st day of February, 1932.

JAMES LITTELL.